(12) United States Patent
Ouyang et al.

(10) Patent No.: US 10,473,854 B2
(45) Date of Patent: Nov. 12, 2019

(54) HIGH-CONTRAST PHOTONIC CRYSTAL "AND" LOGIC GATE

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 178 days.

(21) Appl. No.: 15/626,212

(22) Filed: Jun. 19, 2017

(65) Prior Publication Data
US 2017/0307820 A1 Oct. 26, 2017

Related U.S. Application Data

(63) Continuation of application No. PCT/CN2015/097842, filed on Dec. 18, 2015.

(30) Foreign Application Priority Data

Dec. 19, 2014 (CN) .......................... 2014 1 0799867

(51) Int. Cl.
| | |
|---|---|
| *G02B 6/122* | (2006.01) |
| *G02F 1/365* | (2006.01) |
| *G02F 3/00* | (2006.01) |
| *G02B 6/125* | (2006.01) |
| *B82Y 20/00* | (2011.01) |
| *G02B 6/12* | (2006.01) |

(52) U.S. Cl.
CPC ........... *G02B 6/1225* (2013.01); *G02B 6/125* (2013.01); *G02F 1/365* (2013.01); *G02F 3/00* (2013.01); *G02B 2006/1213* (2013.01)

(58) Field of Classification Search
CPC ........ G02F 3/00; G02F 1/365; G02F 2201/06; G02F 2202/32; G02B 6/1223; G02B 6/1225; G02B 6/125
See application file for complete search history.

(56) References Cited

U.S. PATENT DOCUMENTS

2006/0062507 A1   3/2006   Yanik et al.

FOREIGN PATENT DOCUMENTS

| CN | 101251701 A | * | 8/2008 |
|---|---|---|---|
| CN | 101416107 A | | 4/2009 |

OTHER PUBLICATIONS

Fu et. al. "Silicon photonic crystal all-optical logic gates", 2013, Physics letters A, 377, 329-333 (Year: 2013).*
International Search Report of PCT Patent Application No. PCT/CN2015/097842 dated Mar. 9, 2016.

* cited by examiner

Primary Examiner — Robert E. Tallman
(74) Attorney, Agent, or Firm — Wen IP LLC

(57) ABSTRACT

The present invention discloses a high-contrast photonic crystal AND logic gate, comprising a five-port two-dimensional photonic crystal, a nonlinear cavity unit and a Y-shape AND logic gate unit; and it includes a reference-light input port, two signal-input ports, a system signal-output port and an idle port; the nonlinear cavity unit is coupled with the Y-shape AND logic gate unit. The structure of the present invention, which is compact in structure and ease of integration with other optical logic elements, not only can realize the functions of the high-contrast photonic and logic gate, but also has high contrast of high and low logic output; and is widely applicable to optical communication bands.

14 Claims, 4 Drawing Sheets

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

FIG.5

HIGH-CONTRAST PHOTONIC CRYSTAL "AND" LOGIC GATE

CROSS-REFERENCE TO RELATED APPLICATION

This application is a continuation application of PCT Application No. PCT/CN2015/097842 filed on Dec. 18, 2015 which claims priority to Chinese Patent Application No. 201410799867.8 filed on Dec. 19, 2014, the entire contents of which are hereby incorporated by reference.

FIELD OF THE INVENTION

The present invention relates to two-dimensional (2D) photonic crystal (PhC) optical AND logic gate.

BACKGROUND OF THE INVENTION

In 1987, the concept of PhC was proposed separately by E. Yablonovitch from United States Bell Labs who discussed how to suppress spontaneous radiation and by S. John from Princeton University who made discussions about photonic localization. A PhC is a material structure in which dielectric materials are arranged periodically in space, and is usually an artificial crystal comprising of two or more materials having different dielectric constants.

With the emergence of and in-depth research on PhC, people can control the motion of photons in a PhC material more flexibly and effectively. In combination with traditional semiconductor processes and integrated circuit technologies, design and manufacture of PhC and devices thereof have continually and rapidly marched towards all-optical processing, and PhC has become a breakthrough for photonic integration. In December 1999, PhCs was recognized by the American influential magazine *Science* as one of the top-ten scientific advances in 1999, and therefore has become a hot topic in today's scientific research field.

An all-optical logic device mainly includes an optical amplifier-based logic device, a non-linear loop mirror logic device, a Sagnac interference type logic device, a ring cavity logic device, a multi-mode interference logic device, an optical waveguide coupled logic device, a photoisomerized logic device, a polarization switch optical logic device, a transmission grating optical logic device, etc. These optical logic devices have the common shortcoming of large size in developing large-scale integrated optical circuits. With the improvement of science and technology in recent years, people have also done research and developed quantum optical logic devices, nano material optical logic devices and PhC optical logic devices, which all conform to the dimensional requirement of large-scale photonic integrated optical circuit. For modern manufacturing processes, however, the quantum optical logic devices and the nanomaterial optical logic devices are very difficult to be manufactured, whereas the PhC optical logic devices have competitive advantages in terms of manufacturing process.

In recent years, PhC logic devices have become a hot area of research drawing widespread attentions, and it is highly likely for them to replace the current widely-applied electronic logic devices in the near future.

SUMMARY OF THE INVENTION

The present invention is aimed at overcoming the defects of the prior art and providing a high-contrast PhC AND logic gate which is compact in structure, high in contrast of the high and low logic outputs, and easy to integrate with other optical logic elements.

The technical solution proposal adopted by the invention to solve the technical problem is as follows:

An high-contrast PhC AND logic gate, wherein the high-contrast PhC AND logic gate is a structure of five-port 2D PhC, comprising a nonlinear cavity unit and a Y-shape AND logic gate unit including a first reference-light input port, two system signal-input ports, a first system signal-output port and a first idle port; the nonlinear cavity unit is coupled with the Y-shape AND logic gate unit.

The nonlinear unit is a 2D PhC cross-waveguide nonlinear cavity; and the nonlinear cavity unit includes a second reference-signal input port, an intermediate signal-input port, a second system signal-output port and a second idle port.

The Y-shape AND logic gate unit includes two signal-input ports and an intermediate signal-output port.

The intermediate signal-input port of the nonlinear cavity unit is connected with the intermediate signal-output port of the Y-shape AND logic gate unit.

The 2D PhC cross-waveguide nonlinear cavity includes a high-refractive-index dielectric pillar and the 2D PhC cross intersected waveguide is a four-port network; a left port of the four-port network is the second reference-light input port, a lower port of the four-port network is the intermediate signal-input port, an upper port of the four-port network is the second system signal-output port, and a right port of the four-port network is the second idle port; two mutually-orthogonal quasi- one-dimensional (1D) PhC structures are placed in two waveguide directions crossed at a center of the cross waveguide; a dielectric pillar is arranged in a middle of a cross waveguide, the dielectric pillar is made of a nonlinear material, a cross section of the dielectric pillar is square, polygonal circular, or oval, and a refractive index of the dielectric pillar is 3.4 or another value more than 2; a dielectric constant of a rectangular linear-dielectric pillars clinging to the central dielectric pillar and close to the signal-output port is equal to that of the central dielectric pillar under low-light-power conditions; the quasi-1D PhC structures and the dielectric pillars constitute a waveguide defect cavity.

The twelve rectangular high-refractive-index linear-dielectric pillars and one square dielectric pillar are arranged in the center of the 2D PhC cross-waveguide nonlinear cavity in a form of the quasi-1D PhC along longitudinal and transverse waveguide directions, the central dielectric pillar clings to four adjacent rectangular linear-dielectric pillars and a distance there between is 0, and every two adjacent rectangular linear-dielectric pillars are spaced 0.2668 d from each other.

The Y-shape AND logic gate unit is of a three-port waveguide network PhC structure, the lower ports of the three-port network are respectively the two signal-input ports, and the upper port of the three-port waveguide is the immediate signal-output port; a dielectric pillar is made of a nonlinear material arranged at the intersection of the three-port waveguide, and the dielectric pillar is a circular nonlinear-dielectric pillar; and a radius of the nonlinear-dielectric pillar is the same as that of the linear-dielectric pillar.

The cross section of the high-refractive-index linear-dielectric pillar of the 2D PhC is circular, elliptic, polygonal or triangular.

The background filling material for the 2D PhC is air or a low-refractive-index dielectric having a refractive index less than 1.4.

The 2D PhC structure is a (2m+1)×(2n+1) array structure, where m is an integer more than or equal to 4, and where n is an integer more than or equal to 7.

The cross section of the high-refractive-index linear-dielectric pillar of the 2D PhC is circular, elliptic, polygonal or triangular.

The background filling material for the 2D PhC is air or a low-refractive-index dielectric having a refractive index less than 1.4.

The 2D PhC structure is a (2m+1)×(2n+1) array structure, where m is an integer more than or equal to 4, and where n is an integer more than or equal to 7.

The PhC logic device of the present invention is widely applied to optical communication bands. Compared with the prior art, it has the following advantages:

1. Compact in structure, and ease of integration with other optical logic elements;
2. The PhC logic device can directly carry out all-optical logic functions of "AND", "OR", "NOT" and the like, is a core device for realizing all-optical computing.
3. Through the amplitude transform characteristic of the nonlinear cavity, not only can the functions of the high-contrast PhC logic gate be realized, but also the contrast of high and low logic outputs is high; and
4. Strong anti-interference capability and high in computing speed.

These and other objects and advantages of the present invention will become readily apparent to those skilled in the art upon reading the following detailed description and claims and by referring to the accompanying drawings.

BRIEF DESCRIPTION OF THE DRAWINGS

The present invention is more specifically described in the following paragraphs by reference to the drawings attached only by way of example.

In FIG. 1, indications are: nonlinear cavity unit 01, Y-shape AND logic gate unit 02, reference-light input port 11, first signal-input port 12, second signal-input port 13, idle port 14, system signal-output port 15, first rectangular high-refractive-index linear-dielectric pillar 16, second rectangular high-refractive-index linear-dielectric pillar 17, square nonlinear-dielectric pillar 18, circular high-refractive-index linear-dielectric pillar 19, circular nonlinear-dielectric pillar 20

In FIG. 2(a), wherein indicated are: first signal-input port 12, second signal-input port 13, and immediate signal-output port 32

In FIG. 2(b), wherein indicated are: reference-light input port 11, immediate signal-input port 31, idle port 14 and system second signal-output port 15.

FIG. 4 is the logic signal-output waveform of "Output 2" in FIG. 1;

FIG. 4 is the logic signal-output waveform of "Output 3" in FIG. 1;

FIG. 5 is a logic operation truth table for FIG. 2(b).

DETAILED DESCRIPTION OF THE EMBODIMENTS

The terms a or an, as used herein, are defined as one or more than one, The term plurality, as used herein, is defined as two or more than two. The term another, as used herein, is defined as at least a second or more.

Figure 1:
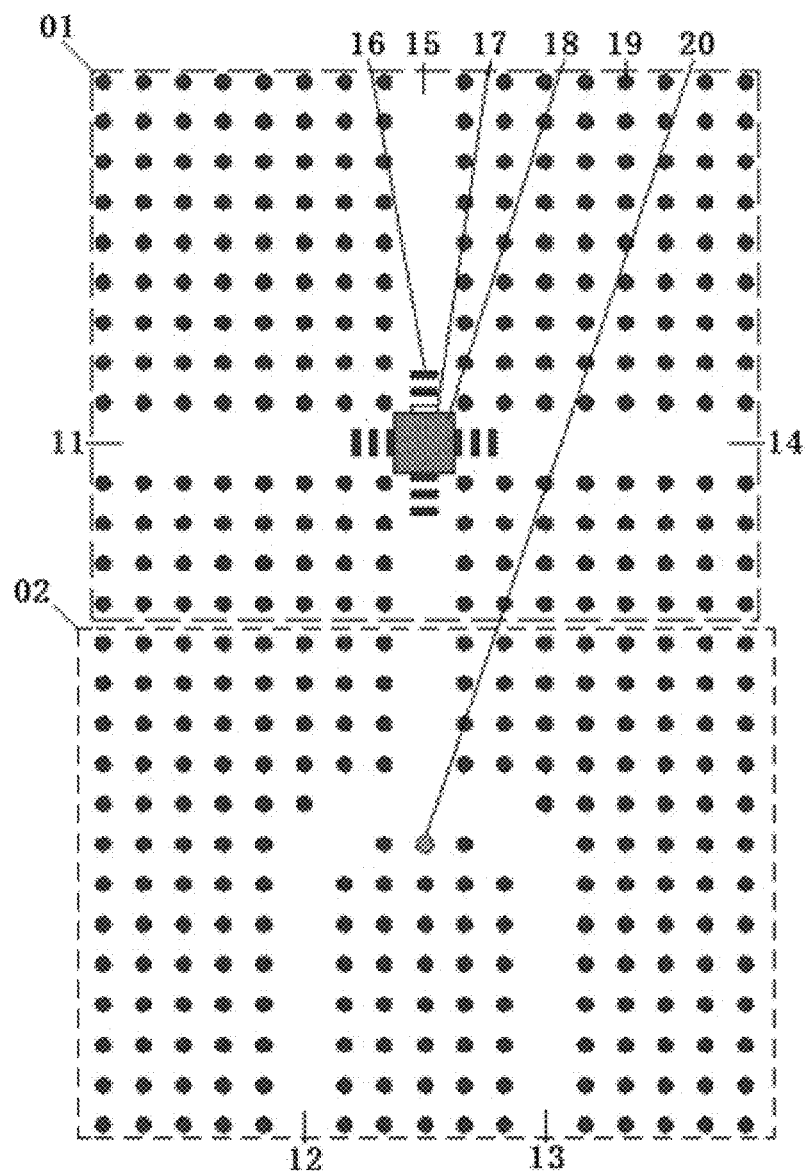
FIG. 1 is a structural diagram of a high-contrast PhC AND logic gate of the present invention.

As shown in FIG. 1, the high-contrast PhC AND logic gate of the present invention is a structure of five-port PhC, and includes a nonlinear cavity unit 01 and a Y-shape AND logic gate unit 02; the high-contrast PhC AND logic gate includes a reference-light input port, two signal-input ports, a system signal-output port and an idle port; the nonlinear cavity unit 01 is a 2D PhC cross-waveguide nonlinear cavity, and realizes given logic functions by using the preceding-stage logic output as a logic input according to the logic operation characteristics itself; the Y-shape AND logic gate unit 02 is of a three-port Y-shape PhC structure, performs AND logic operation on input signals and includes two signal-input ports and an immediate signal-output port; the PhC AND logic gate 02 is of a PhC structure of a three-port waveguide network, wherein the lower ports of the three-port network are respectively the two signal-input ports, and the upper port of the three-port network is the immediate signal-output port; a dielectric pillar 20 made of a nonlinear material is arranged at the junction of a three-port waveguide, wherein the dielectric pillar 20 is a circular nonlinear-dielectric pillar, which is made of a Kerr shape nonlinear material, and has a dielectric constant of 5 under low-light-power conditions; and the radius of the nonlinear-dielectric pillar 20 is the same as that of the circular high-refractive-index linear-dielectric pillar 19.

The nonlinear cavity unit 01 is a 2D PhC cross-waveguide nonlinear cavity and is a 2D PhC cross-waveguide four-port network formed by high-refractive-index dielectric pillars, wherein the left port of the four-port network is a reference signal-input port, the lower port of the four-port network is an intermediate signal-input port, the upper port of the four-port network is a signal-output port, and the right port of the four-port network is an idle port; two mutually-orthogonal quasi-1D PhC structures are placed in two waveguide directions crossed at the center of a cross-waveguide, wherein a dielectric pillar is arranged in the middle of the cross waveguide, the dielectric pillar is a square nonlinear-dielectric pillar; the dielectric pillar is made of a nonlinear material, the cross section of the dielectric pillar is square, polygonal circular, or oval, and the refractive index of the dielectric pillar is 3.4 or another value more than 2; and the dielectric constant of a rectangular linear pillar clinging to the central dielectric pillar and close to the signal-output port is equal to that of the central dielectric pillar under low-light-power conditions; the quasi-1D PhC structures and the dielectric pillar constitute a waveguide defect cavity. Twelve rectangular high-refractive-index linear-dielectric pillars and one square nonlinear-dielectric pillar are arranged in the center of the 2D PhC cross-waveguide nonlinear cavity in the form of a quasi-1D PhC along longitudinal and transverse waveguide directions, the first rectangular high-refractive-index linear-dielectric pillar 16 has a refractive index of 3.4; the second rectangular high-refractive-index linear-dielectric pillar has a dielectric constant being the same as that of a nonlinear-dielectric pillar under low-light-power conditions, every two adjacent rectangular linear-dielectric pillars are spaced 0.2668 d from each other, and the central square nonlinear-dielectric pillar in the cross-waveguide nonlinear cavity is made of a Kerr type nonlinear material, and a dielectric pillar constant of 7.9 under low-light-power conditions; the central square nonlinear-dielectric pillar clings to the four adjacent rectangular linear-dielectric pillars and the distance there between is 0; circular high-refractive-index linear-dielectric pillar 19 in the cross-waveguide nonlinear cavity is made of a Si nonlinear material, and has a refractive index of 3.4.

The present invention is based on the Photonic Bandgap (PBG) characteristic, quasi-1D PhC defect state, tunneling effect and optical Kerr nonlinear effect of the 2D PhC cross-waveguide nonlinear cavity shown in FIG. 1, wherein the nonlinear cavity unit 01 realizes high-contrast PhC AND logic gate functions. Introduced first is the basic principle of the PhC nonlinear cavity in the present invention: a 2D PhC provides a PBG with certain bandwidth, a light wave with its wavelength falling into this bandgap can be propagated in an optical circuit designed inside the PhC, and the operating wavelength of the device is thus set to certain wavelength in the PBG; the quasi-1D PhC structure arranged in the center of the cross waveguide and the nonlinear effect of the central nonlinear-dielectric pillar 18 together provide a defect state mode, which, as the input light wave reaches a certain light intensity, shifts to the operating frequency of the system, so that the structure produces the tunneling effect and signals are output from the output port 5.

Figure 2:
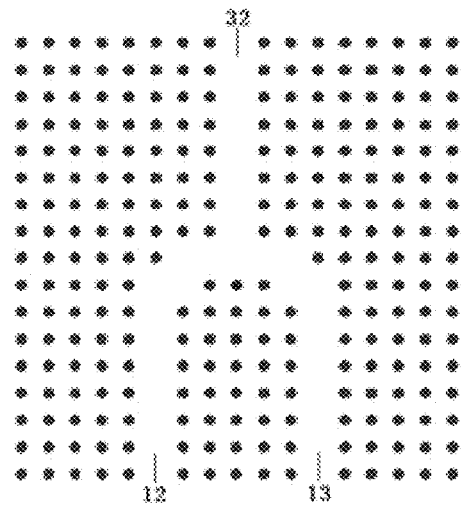
FIG. 2(a) is a structural diagram of the Y-shape AND logic gate unit 02 shown in FIG. 1.
FIG. 2(b) is a structural diagram of the nonlinear cavity unit 01 shown in FIG. 1.
Figure 2:
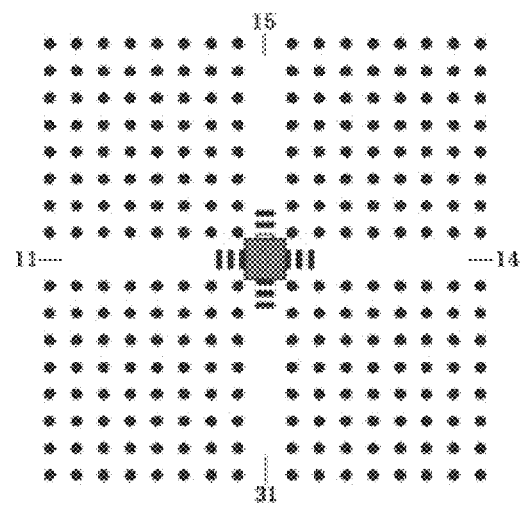
Figure 3:
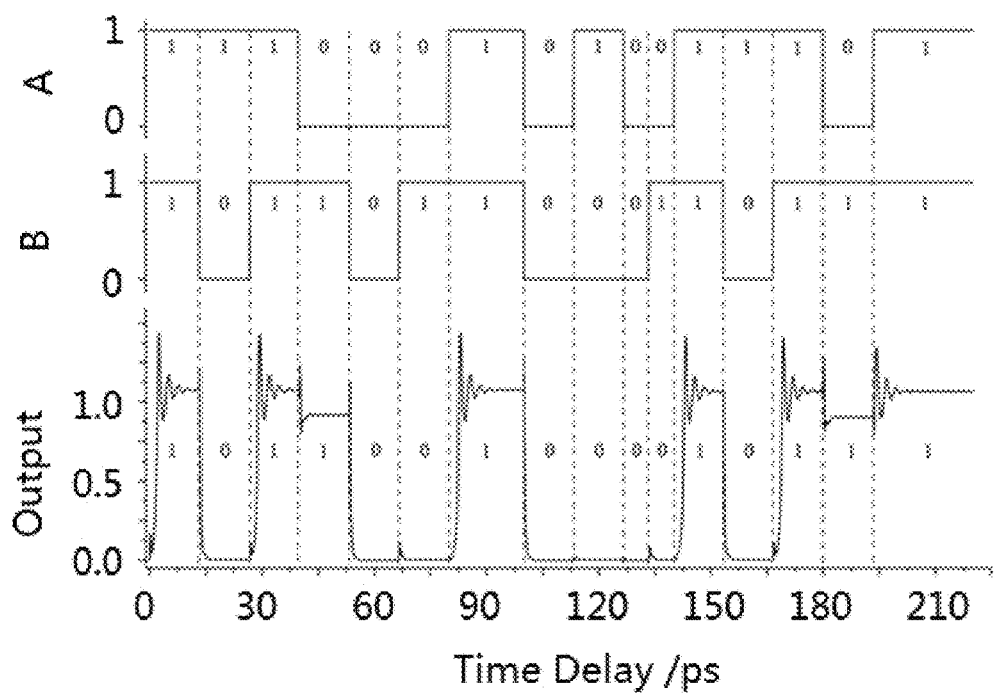
FIG. 3 is a waveform diagram of the basic logic functions for FIG. 2(b).

For the lattice constant d of 1 µm and the operating wavelength of 2.976 µm, referring to the 2D PhC cross-waveguide nonlinear cavity 01 shown in FIG. 2(b), and for a signal A input from the port 11, and a signal B input from the port 31 shown by the upper two diagrams in FIG. 3, the logic output waveforms are obtained and indicated at the lower part in FIG. 3. A logic operation truth table for the structure shown in FIG. 2(b) can be obtained according to the logic operation characteristic shown in FIG. 3, as illustrated in FIG. 5. In FIG. 5, C indicates a current state $Q^n$, and Y indicates a signal output of the output port 15 of the nonlinear cavity unit, i.e., the next state $Q^{n+1}$. A logic expression of the nonlinear cavity unit can be obtained according to the truth table.

$$Y = AB + BC \quad (1)$$

That is $$Q^{n+1} = AB + BQ^n \quad (2)$$

Figure 4:
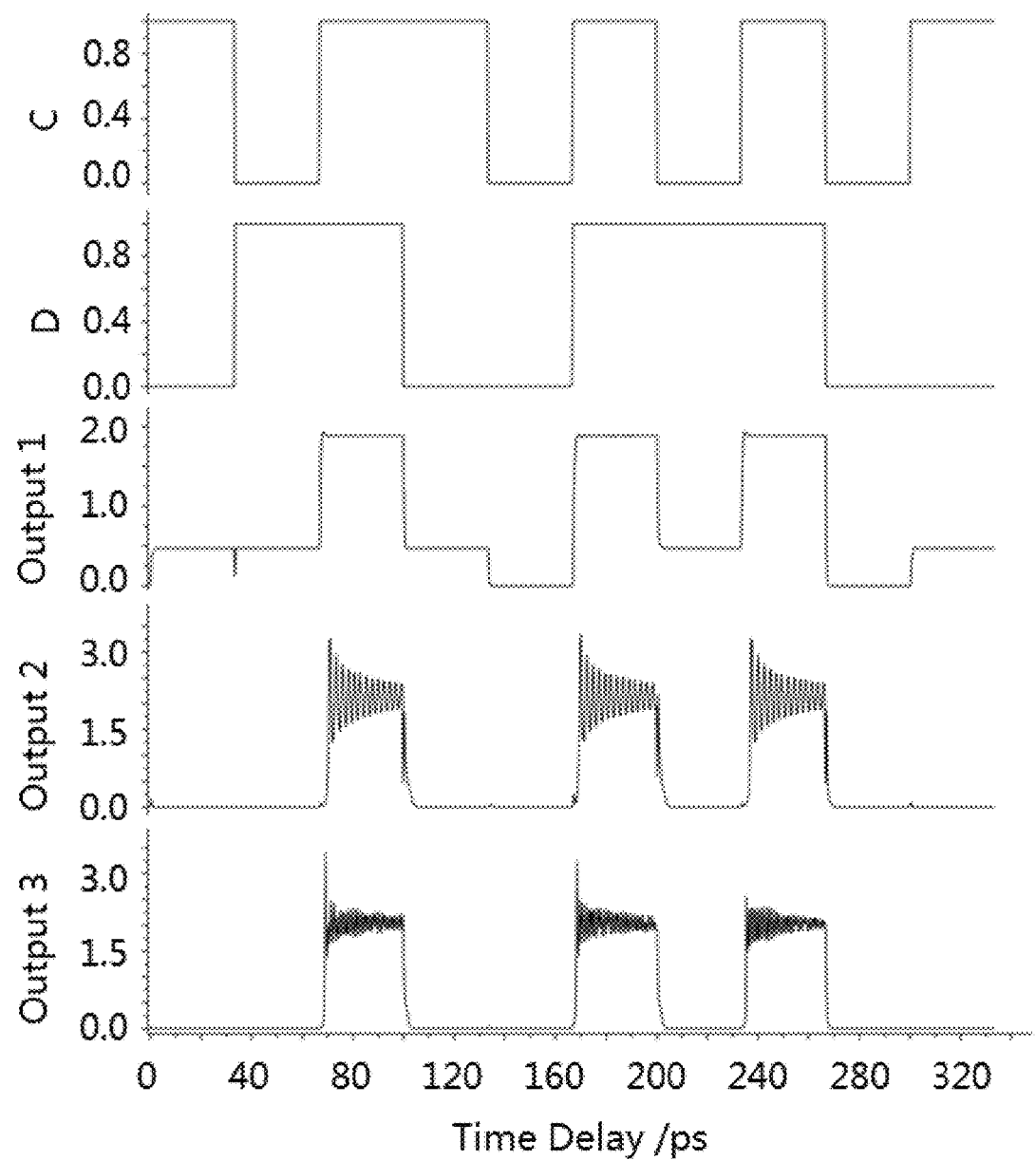
FIG. 4 is the output signal waveform of "Output 1" in FIG. 2(a)

Referring to the PhC Y-shape AND logic gate structure shown in FIG. 2(a), a signal C is input to the port 12, a signal D is input to the port 13, and the output signal waveform of the port 32 is as shown by "Output 1" in FIG. 4. The nonlinear cavity unit 01 is coupled with the Y-type AND logic gate unit 02, i.e., the intermediate signal-input port 31 of the nonlinear cavity unit 01 is connected with the intermediate signal-output port 32 of the Y-shape AND logic gate unit 02, and it is supposed that the AND logic output signal of the Y-shape AND logic gate unit 02 is G, i.e., the AND logic output signal G of the Y-shape AND logic gate unit 02 is the input signal of the intermediate signal-input port 31 of the nonlinear cavity unit 01. At the moment, reference light E=1 is input to the reference-light input port 11 of the high-contrast PhC AND logic gate, and it can be obtained from formula 2:

$$Q^{n+1} = G \quad (3)$$

Finally, the system output port 15 will output the high-contrast AND logic signal G.

The 2D PhC structure of the device of the present invention is a (2m+1)×(2n+1) array structure, where m is an integer more than or equal to 4, and where n is an integer more than or equal to 7, Design and simulation results will be provided below in an embodiment given in combination with the accompanying drawings, wherein the embodiment is exemplified by a 17×27 array structure, and design and simulation results are given, taking the lattice constant d of the 2D PhC array being 1 µm and 0.5208 µm respectively as an example.

Embodiment 1

Referring to that shown in FIG. 1, the lattice constant d is 1 µm; the operating wavelength is 2.976 µm; the radius of the circular high-refractive-index linear-dielectric pillar 19 is 0.18 µm; the long sides of the first rectangular high-refractive-index linear-dielectric pillar 16 are 0.613 µm, and the short sides are 0.162 µm; the size of the second rectangular high-refractive-index linear-dielectric pillar 17 is the same as that of the first rectangular high-refractive-index linear-dielectric pillar 16; the side length of square nonlinear-dielectric pillar 18 is 1.5 µm, and the third-order nonlinear coefficient is $1.33 \times 10^{-2}$ µm$^2$/V$^2$; and the distance between every two adjacent rectangular linear-dielectric pillars is 0.2668 µm; the radius of the circular nonlinear-dielectric pillar 20 is 0.18 µm, and the third-order nonlinear coefficient is $1 \times 10^{-4}$ µm$^2$/V$^2$;

Referring to the structure shown in FIG. 2(a), a signal C and a signal D are respectively input to the signal-input port 12 and the signal-input port 13. The waveforms of the signal C and the signal D are shown in FIG. 4, and the output signal of the intermediate signal-output port 32 of the Y-shape AND logic gate unit 02 is shown by "Output 1" in FIG. 4. The logic output having logic amplitude output lower than 0.5 $P_0$ is set as logic 0, and the logic output having logic amplitude output higher than 0.5 $P_0$ is set as logic 1. It can be obtained that the output amplitude of the logic 1 of the intermediate signal-output port 32 of the Y-shape AND logic gate unit 02 is about 1.88 $P_0$, the output amplitude of the logic 0 is about 0.47 $P_0$ (except the condition that the two inputs are 0), and the contrast of the high and low logics is about 6 dB. The intermediate signal-output port 32 of the Y-shape AND logic gate unit 02 shown in FIG. 2(a) is coupled with the intermediate signal-input port 31 of the nonlinear cavity unit 01 shown in FIG. 2(b), and the structure shown in FIG. 1 can thus be obtained. Similarly, signal-input Port 12 and signal-input Port 13 are respectively input by the signal C and the signal D shown in FIG. 4. The logic output waveform of the high-contrast PhC AND gate of the present invention as shown by "Output 2" can be obtained for the lattice constant d=1 µm and the operating wavelength is 2.976 µm. For the waveform of "Output 2" in FIG. 4 shows, the logic 1 of the system output 15 oscillates at a high amplitude interval, and is continually converged to the amplitude of 2.125 $P_0$; the amplitude of the logic 0 of the system output 15 is 0.006 $P_0$, and the low logic amplitude is well suppressed. The high and low logic contrast of the system output 15 is more than 25 dB.

Embodiments 2

The lattice constant d is 0.5208 µm; the operating wavelength is 1.55 µm; the radius of the circular high-refractive-index linear-dielectric pillar 19 is 0.0937 µm; the long sides of the first rectangular high-refractive-index linear-dielectric pillar 16 are 0.3193 µm, and the short sides are 0.0844 µm; the size of the second rectangular high-refractive-index linear-dielectric pillar 17 is the same as that of the first rectangular high-refractive-index linear-dielectric pillar 16; the side length of square nonlinear-dielectric pillar 18 is 0.7812 µm, and the third-order nonlinear coefficient is $1.33 \times 10^{-2}$ µm$^2$/V$^2$; and the distance between every two adjacent rectangular linear-dielectric pillars is 0.1389 µm; the radius of the circular nonlinear-dielectric pillar 20 is 0.0937 µm, and the third-order nonlinear coefficient is $1 \times 10^{-4}$ µm$^2$/V$^2$;

As shown in FIG. 1, signal-input Port 12 and signal-input Port 13 are respectively input by the signal C and the signal D shown in FIG. 4. The logic output waveform of the high-contrast PhC AND gate of the present invention as shown by "Output 3" can be obtained for the lattice constant d=0.5208 µm and the operating wavelength is 1.55 µm.

As the waveform of "Output 3" in FIG. 4 shows, the amplitude of the logic 1 of the system output 15 oscillates along 2.05 $P_0$, and gradually becomes stable. The amplitude of the logic 0 of the system output 15 is 0.008 $P_0$, and the low logic amplitude is well suppressed. The high and low logic contrast of the system output 15 is more than 24 dB.

While the invention has been described in terms of various specific embodiments, those skilled in the art will recognize that the invention can be practiced with modification within the spirit and scope of the claims.

What is claimed is:

1. A high-contrast photonic crystal (PhC) AND logic gate, wherein said high-contrast PhC AND logic gate is a structure of five-port two-dimensional (2D) PhC, comprising:
    a reference-light input port, two signal-input ports, a system signal-output port and an idle port; and further comprising:
    a nonlinear cavity unit and a Y-shape AND logic gate unit, and said nonlinear cavity unit is coupled with said Y-shape AND logic gate unit; and
    the nonlinear cavity unit comprising one or more rectangular high-refractive-index linear-dielectric pillars to form the 2D PhC cross intersected waveguide four-port network; a left end of the four-port network is a reference-light input port, a lower end of the four-port network is an intermediate signal-input port, an upper end of the four-port network is a system signal-output port, and a right end of the four-port network is an idle port; a square non-linear dielectric pillar is arranged in a middle of a cross-waveguide, a cross section of the square non-linear dielectric pillar is square; twelve rectangular high-refractive-index linear-dielectric pillars and one square non-linear dielectric pillar are arranged in a center of the 2D PhC cross-waveguide nonlinear cavity in a form of a quasi-1D PhC along longitudinal direction in vertical waveguide and transverse directions in horizontal waveguide.

2. The high-contrast PhC AND logic gate of claim 1, wherein said intermediate signal-input port of said nonlinear cavity unit is connected with an intermediate signal-output port of said Y-shape AND logic gate unit.

3. The high-contrast PhC AND logic gate of claim 1, wherein a square non-linear dielectric pillar clings to a four adjacent rectangular high-refractive-index linear-dielectric pillars and a distance there between is 0, and every two adjacent rectangular high-refractive-index linear-dielectric pillars are spaced 0.2668d from each other, where d is a lattice constant.

4. The high-contrast PhC AND logic gate of claim 1, wherein a cross section of said high-refractive-index linear-dielectric pillar of said 2D PhC is circular, elliptic, polygonal, or triangular.

5. The high-contrast PhC AND logic gate of claim 1, wherein said 2D PhC structure is a (2m+1)×(2n+1) array structure, where m is an integer more than or equal to 4, and where n is an integer more than or equal to 7.

6. The high-contrast PhC AND logic gate of claim 1, wherein two mutually-orthogonal quasi-one-dimensional (1D) PhC structures are placed along longitudinal direction in vertical waveguide and transverse directions in horizontal waveguide crossed at a center of the cross-waveguide; the square non-linear dielectric pillar is made of a nonlinear material, and a refractive index of the square non-linear dielectric pillar is value greater than 2; a dielectric constant of one rectangular high- refractive-index linear-dielectric pillar linear clinging to the square non-linear dielectric pillar and close to the system signal-output port is equal to that of the square non-linear dielectric pillar under low-light-power conditions; and the quasi-1D PhC structures and the square non-linear dielectric pillar constitute a waveguide defect cavity.

7. The high-contrast PhC AND logic gate of claim 1, wherein a refractive index of the square non-linear dielectric pillar is 3.4.

8. The high-contrast PhC AND logic gate of claim 1, wherein a background filling material for the 2D PhC is a low-refractive-index dielectric having a refractive index less than 1.4.

9. The high-contrast PhC AND logic gate of claim 1, wherein a background filling material for the 2D PhC is air.

10. A high-contrast photonic crystal (PhC) AND logic gate, wherein the high-contrast PhC AND logic gate is a structure five-port two-dimensional (2D) PhC, comprising:
    a reference-light input port, two signal-input ports, a system signal-output port and an idle port; and further comprising:
    a nonlinear cavity unit and a Y-shape AND logic gate unit, and the nonlinear cavity unit is coupled with the Y-shape AND logic gate unit; and
    the Y-shape AND logic gate unit is of a three-port waveguide network PhC structure, a lower ends of the three-port waveguide network are respectively the two signal-input ports, and an upper end of the three-port waveguide network is an immediate signal-output port; a nonlinear-dielectric pillar is arranged at an intersection of the three-port waveguide network, and the nonlinear-dielectric pillar is circular.

11. The high-contrast PhC AND logic gate of claim 10, wherein a radius of the nonlinear-dielectric pillar is a same as that of a high-refractive-index linear-dielectric pillar.

12. The high-contr ast PhC AND logic gate of claim 10, wherein a background filling material for the 2D PhC is a low-refractive-index dielectric having a refractive index less than 1.4.

13. The high-contrast PhC AND logic gate of claim 10, wherein a background filling material for the 2D PhC is air.

14. The high-contrast PhC AND logic gate of claim 10, wherein the 2D PhC structure is a (2m+1)×(2n+1) array structure, where m is an integer more than or equal to 4, and n is an integer more than or equal to 7.

* * * * *